US006763250B1

(12) United States Patent
Forbes, Jr.

(10) Patent No.: US 6,763,250 B1
(45) Date of Patent: Jul. 13, 2004

(54) RAPIDLY-DEPLOYABLE FIXED WIRELESS COMMUNICATION SYSTEM AND METHOD OF SWITCHING DURING OPERATION OF SAME

(76) Inventor: Joseph W. Forbes, Jr., 6345 Zinfandel Dr., Suwanne, GA (US) 30024-3487

( * ) Notice: Subject to any disclaimer, the term of this patent is extended or adjusted under 35 U.S.C. 154(b) by 260 days.

(21) Appl. No.: 09/635,942

(22) Filed: Aug. 10, 2000

Related U.S. Application Data
(60) Provisional application No. 60/184,733, filed on Feb. 23, 2000.

(51) Int. Cl.[7] .................................................. H04B 1/38
(52) U.S. Cl. ........................ 455/560; 455/561; 455/445
(58) Field of Search ............................. 455/455, 448, 455/560, 561, 564, 3.01, 406, 408; 370/351, 356, 338, 328, 400, 402

(56) References Cited

U.S. PATENT DOCUMENTS

| | | | | |
|---|---|---|---|---|
| 6,078,805 A | * | 6/2000 | Scott | 455/406 |
| 6,233,234 B1 | * | 5/2001 | Curry et al. | 370/356 |
| 6,236,365 B1 | * | 5/2001 | LeBlanc et al. | 342/457 |
| 6,512,916 B1 | * | 1/2003 | Forbes, Jr. | 455/67.16 |
| 6,587,890 B1 | * | 7/2003 | Kult et al. | 709/328 |

* cited by examiner

*Primary Examiner*—Nick Corsaro
*Assistant Examiner*—Tan Trinh

(57) ABSTRACT

A fixed wireless communication system (100) comprises a wireless subsystem and a backbone network. The wireless subsystem includes at least one base transceiver site (104, 105) and at least one stationary remote unit (107, 108). The stationary remote unit communicates with the base transceiver site via a wireless communication resource (110, 111). The wireless subsystem resides in a first geographic area (155) served by a first public switched telephone network (PSTN) access switch (129). The backbone network includes at least one point of presence (POP, 120–123) and a switch (125). The switch serves to at least route voice communications between the stationary remote unit and a PSTN subscriber unit (139) residing in a second geographic area (157) served by a second PSTN access switch (135). The POPs couple the switch to at least the wireless subsystem, the first PSTN access switch, and the second PSTN access switch. The switch employs a method to facilitate communication between a wireless subsystem subscriber (101, 102) and either a PSTN subscriber (133, 139) or another wireless subsystem subscriber, wherein a switching path is established to include a PSTN access switch only in the event that received call set-up information indicates that the communication involves a PSTN subscriber.

5 Claims, 3 Drawing Sheets

RAPIDLY-DEPLOYABLE FIXED WIRELESS COMMUNICATION SYSTEM AND METHOD OF SWITCHING DURING OPERATION OF SAME

CROSS-REFERENCE TO RELATED APPLICATIONS

Priority is hereby claimed under 35 U.S.C. § 119(e) to co-pending, commonly-assigned United States Provisional Patent Application Serial No. 60/184,733, filed Feb. 23, 2000 and entitled "Fixed Wireless Communication System and Method for Selecting Markets in Which to Deploy Same", which application is expressly incorporated herein by reference in its entirety to form part of the present disclosure.

FIELD OF THE INVENTION

The present invention relates generally to fixed wireless communication systems and, in particular, to a fixed wireless communication system that may be rapidly deployed in lower tier markets through its use of regional switching and a method of regional switching during operation of such a communication system.

BACKGROUND OF THE INVENTION

The Telecommunications Act of 1996 deregulated local telephone service, thereby enabling new service providers, such as competitive local exchange carriers (CLECs), to compete with local telephone companies to install, lease, and/or resell unbundled loop or switch access services to customers. As a result of the Act, CLECs have the opportunity to compete with local exchange carriers (LECs or local telephone companies) and alternative service providers, such as commercial mobile radio service (CMRS) providers, in offering customers access to the public switched telephone network (PSTN). Internet service providers (ISPs) may also become CLECs in order to meet competitive pressure to reduce Internet access rates. With the continually increasing popularity of the Internet and the trend for ISPs to also provide CLEC services (or CLECs to provide Internet access services), existing and potential customers are demanding more features and bandwidth from the carriers of Internet traffic. A major portion of such demand is for Internet access to owners of rural businesses and residences.

The net effect of the convergence of voice and the Internet is competition between LECs to provide a complete voice and data communications solutions to rural businesses and residences. Such competition can exist only if CLECs or CMRS providers can efficiently design networks that meet or exceed voice and data service specifications of current LEC networks.

Although certain types of high speed (i.e., greater than 56 kilobits per second (kbps)) Internet service, such as integrated digital services network (ISDN), asymmetric digital subscriber lines (ADSL) and/or DSL, are alleged to be provided or forthcoming in some low populous or rural markets (i.e., with populations of less than approximately 165,000 persons), such service is either inferior or has yet to be implemented due to the substantial distance (e.g., twenty-five miles or more) of the markets from the central serving offices of the service providers. These low populous or lower tier markets (e.g., cities and counties) often include educated and successful segments of the population desirous of an alternative to traditional low speed, dial-up methods of Internet access. The combination of the lack of CLECs and DSL providers, and the poor service offered by the existing LECs serving these lower tier markets provides market opportunity for new broadband service providers.

Fixed wireless networks (FWNs), such as wireless local loops (WLLs), are an efficient means for providing access to the PSTN or the Internet in rural or low populous areas. Such networks include a wireless infrastructure, such as base transceiver sites (BTSs), and wireline switching equipment within a so-called local access and transport area (LATA). An LATA is a geographic area served by one or more LECs and in which access to the PSTN is provided via a PSTN access switch, such as a conventional local access tandem switch. The BTSs are connected to localized switching equipment via leased high speed lines (e.g., where the FWN provider is also the LEC) or via microwave links. The localized switching equipment is then connected to the PSTN through the PSTN access switch.

In existing WLL networks, a remote wireless transceiver and antenna system is attached to the outside of a residence or business and connected to the telephone lines located within the building. A call emanating from a subscriber within the residence or business is communicated through the in-building telephone lines to the remote wireless transceiver, which in turn communicates the call to a BTS via a wireless communication resource or channel. The BTS forwards the call to the localized switching equipment. The switching equipment then routes the call to the appropriate PSTN or WLL subscriber (when the target subscriber is within the LATA) or to the calling subscriber's interexchange carrier (IXC) for long distance service. Thus, WLL networks are coupled to the PSTN and IXCs via localized switching in a manner similar to conventional telephone networks. Existing WLLs are currently limited to providing local exchange services (i.e., local and long-distance telephone services), although wireless technology exists to support both voice and data.

Although WLL technology is a means for providing telephone and data services to low populous areas, existing approaches to implementing FWNs are time-consuming and costly due in large part to the costs and time required to deploy localized switching equipment in each LATA. The increased time and cost associated with deploying localized switching equipment delay the offering of broadband services to low populous areas and make competing with existing LECs difficult.

Therefore, a need exists for a fixed wireless communication system and method of switching during operation of such a system that are capable of providing broadband services, such as voice, data, and video to lower tier markets, but do not require the time and cost expenditures associated with incorporating localized switching.

SUMMARY OF THE INVENTION

Generally, the present invention encompasses a fixed wireless communication system and a method of switching during operation of such a system. The fixed wireless communication system includes wireless subsystems connected via microwave links to a backbone network comprising a particular arrangement of points of presence (POPs), points of interface (POIs), regional switching centers, and router subsystems that connect the wireless subsystems to the public switched telephone network (PSTN) and/or the Internet (e.g., via an Internet backbone system, such as the "UUNET" backbone system which is commercially available from UUNET Technologies, Inc. of Fairfax, Va.). Fiber optic transmission lines are preferably used to transport voice, data, and/or video from POIs to POPs to switching centers, and vice versa. Importantly, the backbone network does not utilize localized switching in each local access and transport area (LATA) to couple the wireless subsystems to the PSTN. Rather, the present invention utilizes existing POPs and POIs, and unique regional switching to hub several LATAs, thereby substantially reducing infrastructure costs and expediting deployment of the system in appropriately selected, low populous markets.

In accordance with one aspect of the present invention, the fixed wireless communication system includes a wireless subsystem and a backbone network. The wireless subsystem preferably comprises a wireless local loop subsystem and includes at least one base transceiver site and at least one stationary remote unit, wherein the stationary remote unit(s) communicates with the base transceiver site(s) via one or more wireless communication resources. The wireless subsystem resides in a first geographic area served by a first public switched telephone network (PSTN) access switch. The backbone network includes at least one point of presence (POP) and a switch, wherein the switch serves to at least route voice communications between the stationary remote unit(s) and a PSTN subscriber unit residing in a second geographic area served by a second PSTN access switch. The POP(s) couple the switch to at least the wireless subsystem, the first PSTN access switch, and the second PSTN access switch.

In accordance with another aspect of the present invention, the backbone network of the fixed wireless communication system further includes a microwave transceiver site that operably couples the base transceiver site of the wireless subsystem to a POP. In accordance with yet another aspect of the present invention, the backbone network includes one or more points of interface (POIs) operably coupling respective POPs to corresponding PSTN access switches. In accordance with a further aspect of the present invention, the backbone network includes a router subsystem operably coupled to a POP and serving to route data communications between a data host, such as an Internet backbone system or an external Internet service provider, and a subscriber of the wireless subsystem.

In accordance with still a further aspect of the present invention, the switch serves to route voice communications between the wireless subsystem and at least one of an interexchange carrier, directory assistance, operator services, and an emergency 911 subsystem. In accordance with yet another aspect of the present invention, the wireless subsystem includes multiple stationary remote units, multiple base transceiver sites providing wireless communication services to the stationary remote units and a communication link, such as a microwave link, operably coupling at least two of the base transceiver sites to facilitate access to the backbone network.

In accordance with a preferred aspect of the present invention, the switch is located outside, but serves, both the first geographic area and the second geographic area. In accordance with another aspect of the present invention, the switch may be located within one of the first and second geographic areas, provided that the switch maintains a regional focus serving both the first geographic area and the second geographic area. The geographic areas preferably comprise local access and transport areas (LATAs).

In accordance with another aspect of the present invention, the regional switch facilitates communication between a subscriber of a wireless subsystem located in a first geographic area served by a first PSTN access switch and either a PSTN subscriber located in either the first geographic area or a second geographic area served by a second PSTN access switch, or a subscriber of the wireless subsystem or another wireless subsystem. The switch receives call set-up information from the wireless subsystem via at least a first POP operably coupled between the switch and the wireless subsystem. The switch determines whether the call set-up information indicates a communication between wireless subscribers or between a subscriber to the wireless subsystem and a PSTN subscriber. In the event that the call set-up information indicates a communication between the wireless subsystem subscriber and a PSTN subscriber located in the second geographic area, the switch establishes a switching path for the communication, wherein the switching path includes at least a second POP operably coupled between the switch and the second PSTN access switch.

In the event that the call set-up information indicates a communication between the wireless subsystem subscriber and a PSTN subscriber located in the first geographic area (i.e., the same geographic area that contains the wireless subsystem subscriber), the switch establishes a switching path for the communication, wherein the switching path includes at least the first POP and the first PSTN access switch. In the event that the call set-up information indicates a communication between the wireless subsystem subscriber and a subscriber of a second wireless subsystem, the switch establishes a switching path for the communication, wherein the switching path includes at least the first POP and the POP or POPs operably coupled between the switch and the geographic area containing the second wireless subsystem, but does not include either the first PSTN access switch or the second PSTN access switch. Finally, in the event that the call set-up information indicates a communication within the wireless subsystem containing the wireless subsystem subscriber, the switch establishes a switching path for the communication, wherein the switching path includes the at least the first POP, but does not include the first PSTN access switch. Thus, in accordance with the present invention, communications within a wireless subsystem or between wireless subsystems remain in the wireless subsystems and backbone network and never enter the PSTN (i.e., the communications never pass through a PSTN access switch).

By providing fixed wireless communication service in this manner, the present invention, through its use of existing wireline infrastructure and unique regional switching, enables new broadband service providers to rapidly enter the broadband service market and become providers of local exchange primary line subscriber service, high speed Internet access, and/or long distance service (via connection to an IXC) without substantial wireline infrastructure investment and deployment. The present invention also provides a means for filling the void in broadband service that currently exists in lower tier markets (i.e., markets with populations of less than about 165,000 persons) left by competitive local exchange carriers (CLECs) and Internet Service Providers (ISPs).

Other objects, advantages and novel features of the invention will become more apparent from the following detailed description when taken in conjunction with the accompanying drawings.

DETAILED DESCRIPTION OF A PREFERRED EMBODIMENT

Figure 1:
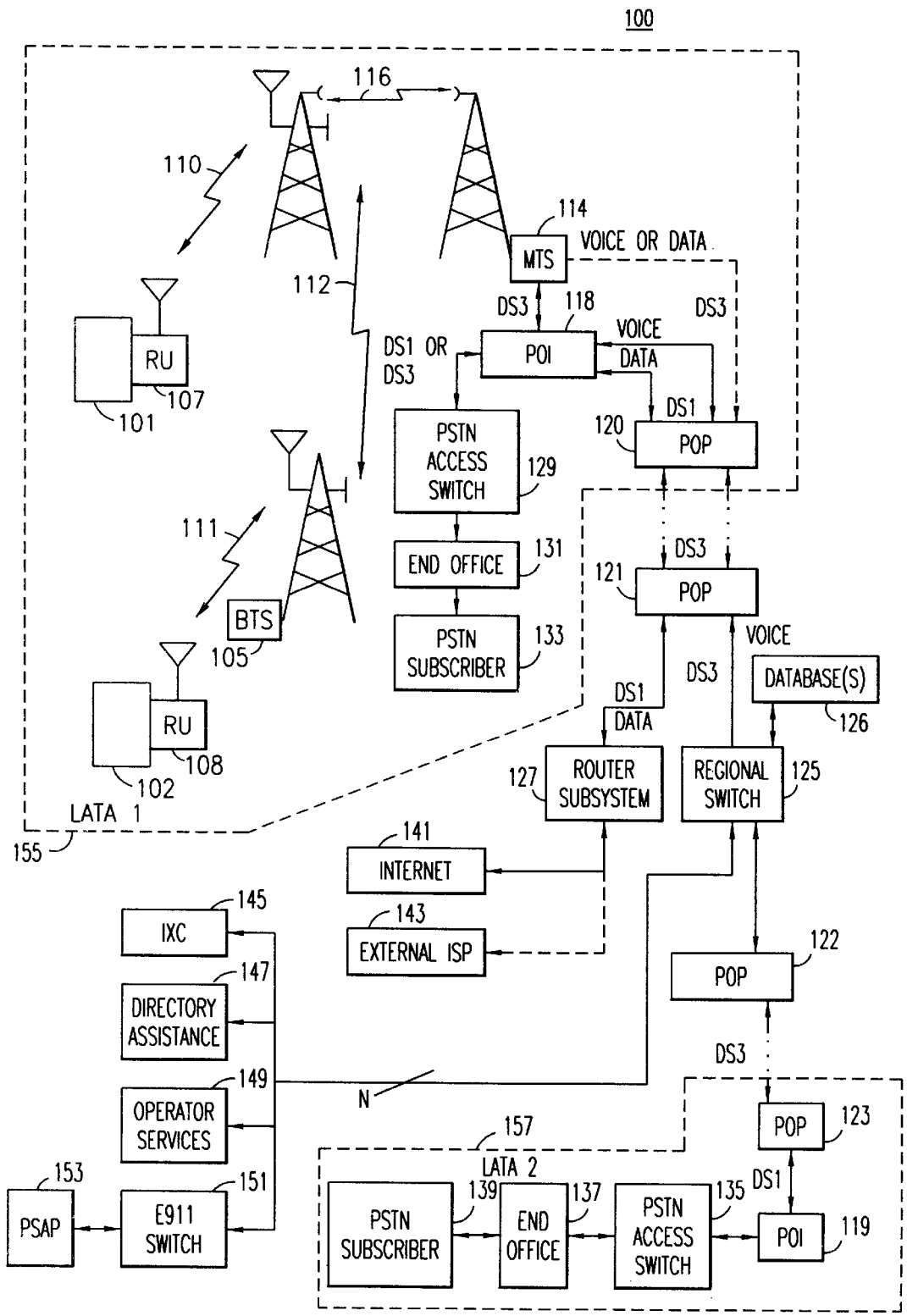
FIG. 1 is a block diagram of an exemplary fixed wireless communication system in accordance with a preferred embodiment of the present invention.
Figure 2:
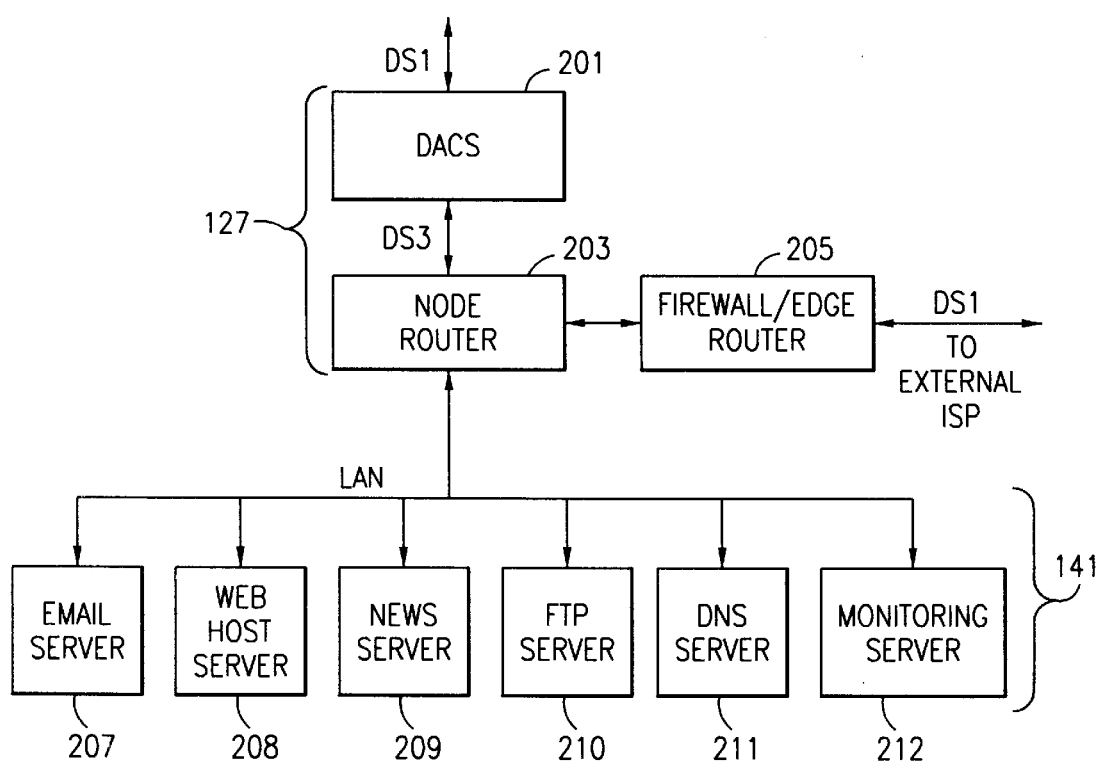
FIG. 2 is an electrical block diagram of a router subsystem incorporated in the communication system of FIG. 1.
Figure 3:
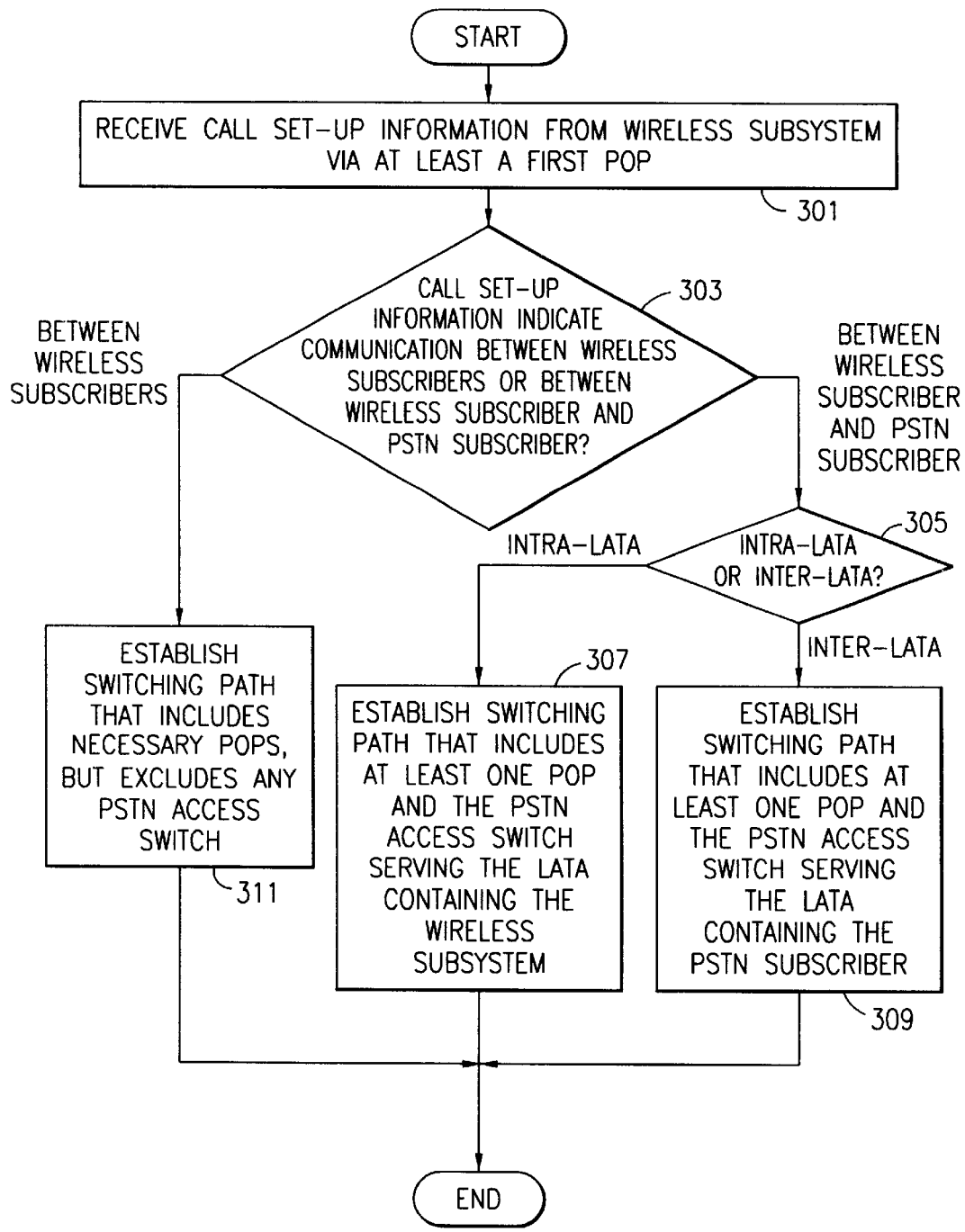
FIG. 3 is a logic flow of steps executed by a regional switch to facilitate communication between subscribers in the fixed wireless communication system of FIG. 1.

The present invention can be more fully understood with reference to FIGS. 1–3, in which like reference numerals designate like items. The general topology of the network is to use a wireless subsystem, such as a wireless local loop (WLL) subsystem, to provide the so-called "last mile" of service, point-to-point microwave from the wireless subsystem to the backbone network, and a unique arrangement of POIs, POPs, switching centers, and router subsystems to implement the backbone network. FIG. 1 is a block diagram of an exemplary fixed wireless communication system 100 in accordance with a preferred embodiment of the present invention. As depicted in FIG. 1, the communication system 100 includes a WLL subsystem, a microwave transport subsystem, and a backbone network coupling a wireless subsystem subscriber 101, 102 to the PSTN, the Internet 141, an interexchange carrier (IXC) 145, the emergency 911 subsystem, and/or ancillary telephony services, such as directory assistance 147 and operator services 149. The WLL subsystem comprises one or more base transceiver sites 104, 105 (two shown) and one or more stationary remote units 107, 108 (two shown). Each base transceiver site (BTS) 104, 105 and each remote unit (RU) 107, 108 includes a radio transceiver and an antenna system.

In accordance with known techniques, a remote unit (e.g., RU 107) receives wireless information (voice, data, and/or video) from its serving BTS 104 via radio signals communicated over a wireless resource 110, down-converts and demodulates the radio signals to extract the communicated information, and converts voice information into pulse code modulated (PCM) plain old telephone service (POTS) signals that can be conventionally processed by a WLL subsystem subscriber's telephone. Each BTS 104, 105 preferably serves RUs 107, 108 located within a two mile (approximately three (3) kilometer) radius of the respective BTS 104, 105. To transmit information, the RU 107 receives PCM or data signals from the subscriber's telephone, modulates and upconverts them in accordance with known techniques, and transmits the modulated signals to the serving BTS 104 over the wireless resource 110.

The WLL subsystem preferably comprises a frequency division multiple access system and the wireless resource 110 preferably comprises a frequency carrier in the Personal Communications Services (PCS) frequency band (approximately 1900 Megahertz (MHz)). Alternatively, the WLL subsystem may utilize any other access scheme, such as time division multiple access or code division multiple access, in which case the wireless resources 110, 111 comprise resources appropriate for the selected WLL subsystem access scheme (e.g., time slot or orthogonal code). Although the carrier frequencies of the wireless resources 110, 111 are preferably in the PCS band, the WLL subsystem of the present invention is not limited to such frequency range and may utilize any carrier frequencies allocated for general purpose radiotelephony or broadband use. The individual components of the WLL subsystem are well-known; thus, no further discussion of them will be presented.

The information received from the RU 107, 108 is forwarded by the BTS 104 via a point-to-point microwave link 116 to a microwave transceiver station (MTS) 114. A microwave transport is preferably used to link the WLL subsystem to the backbone network to eliminate the recurring costs of using LEC resources, such as leased telephone lines, to transport information between the WLL subsystem and the wireline backbone network. The preferred MTS 114 supports digital transmissions over the microwave link 116. The use of digital transmissions results in more efficient utilization of the microwave frequency spectrum, higher traffic carrying capacity of the link 116, substantial reduction in maintenance costs, greater reliability of the link 116, and, most importantly, higher quality audio than is provided over analog links.

In the preferred embodiment, the MTS 114 comprises an existing MTS and antenna tower leased, owned and/or operated by a cellular or PCS service provider. The microwave link 116 preferably provides service at least twenty-five miles (approximately forty (40) kilometers) from the location of the MTS 114.

Not every BTS 104, 105 need be within the coverage area of the MTS 114 to receive broadband service in accordance with the present invention. Rather, as depicted in FIG. 1, BTSs 104, 105 may be interconnected via a microwave link 112 within the WLL subsystem itself provided that microwave link 116 has the capacity (bandwidth) to support multiple BTSs 104, 105. For example, if the MTS 114 supported only one BTS 104, the capacity of microwave link 116 depends on the potential number of simultaneously operating subscribers and may need to be equivalent to the capacity of one or more DS1 wireline links (i.e., capable of supporting at least twenty-four (24) full duplex voice or data channels). Alternatively, if the MTS 114 supports more than one BTS 14, 105, the capacity of microwave link 116 may need to be increased to be equivalent to the capacity of a DS3 wireline link (i.e., capable of supporting up to twenty-eight (28) DS1 circuits). In the latter case, the capacity of the intra-WLL microwave link 112 depends on the potential number of simultaneously operating subscribers served by the particular BTS 105 and may need to be equivalent to the capacity of one or more DS1 wireline links.

The carrier frequency of both the intra-WLL microwave link 112 and the LEC bypass microwave link 116 is preferably six Gigahertz (6 GHz). In the case where an intra-WLL microwave link 112 is utilized, the distance between the linked BTSs 104, 105 depends on a variety of factors, such as antenna height and terrain, but is preferably in the three-to-fifteen mile (approximately five (5) to twenty-four (24) kilometer) range.

After the subscriber's transmission has been received and processed in accordance with known techniques by the MTS 114, the information (voice, data, or video) is forwarded into the backbone network. The backbone network preferably comprises one or more points of interface 118, 119 (two shown), one or more points of presence 120–123 (four shown), one or more regional switches 125 (one shown), and one or more router subsystems 127 (one shown). The points of interface (POIs) 118, 119 and the points of presence (POPs) 120–123 are well-known telephony system elements and are available from various telephone system manufacturers, such as AT&T, Lucent Technologies, Nortel, and Bellcore. The regional switch 125 preferably comprises a Class 5 switch that is commercially available from one or more of the aforementioned telephone system manufacturers. The router subsystem 127 is described in detail below with respect to FIG. 2. Transport of information within the backbone network and between the backbone network and the MTSs 114, the PSTN, the Internet, and the other telephony services preferably occurs over fiber optic cables. Alternatively, such backbone transport may occur over copper lines that support T1 and/or T3 transmissions.

The subscriber information received by the MTS 114 is preferably provided via a DS3 circuit to a POI 118. Alternatively, the information may be provided directly to a POP 120 over a DS3 circuit.

In the event that the information received by the MTS 114 and forwarded to POI 118 is voice information, the POI 118 forwards the information preferably via a DS1 circuit (or alternatively via a DS3 circuit) to the closest proximity POP 120. The POP 120 preferably serves as a hubbing point for the DS1 circuits. Hubbing is a process by which individual circuits or collections of circuits are compressed into a single higher rate circuit. In the preferred embodiment, transmission from the POI 118 to the POP 120 (and vice versa) occurs over DS1 leased circuits. As is known, each DS1 circuit supports up to twenty-four (24) full duplex voice or data channels. By contrast, transmission between POP(s) 120, 121 and from the POPs 121, 122 to the regional switching center 125 occurs over DS3 leased circuits. Each DS3 circuit can support up to twenty-eight (28) DS1 circuits.

However, at any particular time, a DS3 circuit may not be carrying its full complement of DS1 circuits. Therefore, the POPs 120–123, inter alia, function as hubs to compress DS1 circuits into DS3 circuits that have available capacity, thereby reducing the number of DS3 circuits required at any particular time for transporting information over the backbone network. By reducing the number of DS3 circuits through hubbing, the present invention substantially reduces the cost of the backhaul transport without adversely affecting system performance.

After receiving voice information from the POI 118, the POP 120 compresses the DS1 circuits into higher rate DS3 circuits and forwards the information to the regional switch 125 via additional POPs 121 if necessary. The POPs 120–123 are distributed throughout the system 100 in accordance with known techniques based on several factors, including the availability of fiber optic lines and the proximity of the POP(s) 120–123 to the markets they serve. The regional switch 125 may be located either inside or outside an LATA 155, 157 that is currently involved in the call. In FIG. 1, the regional switch 125 is depicted as being outside the LATAs 155, 157 that may be involved in the call. Thus, the regional switch 125 serves multiple LATAs in contrast to prior art localized switches which serve only a single LATA. To expedite implementation of the preferred communication system 100, existing POIs 118, 119 and POPs 120–123 are utilized and appropriately coupled via fiber optic transmission lines to the MTS 114, the regional switch 125, and the router subsystem 127.

Referring now to FIGS. 1 and 3, operation of the regional switch 125 will be described. Upon receiving voice information from the POP(s) 120, 121, the regional switch 125 forwards the call to the appropriate POP 121, 122 in accordance with a previously established switching path. Similar to conventional telephone call set-up procedures, prior to transmission of the voice information, the calling subscriber 101 dials the telephone number of the called subscriber. Upon receiving such dialed digits or equivalent call set-up information (301) from the subscriber 101 via the BTS 104, the MTS 114, the POI 118 (if used), and the POP(s) 120, 121, the regional switch 125 examines the call set-up information (e.g., telephone number) and determines (303) whether the target subscriber is a PSTN subscriber 133, 139 or a fixed wireless network subscriber (e.g., subscriber 102). The regional switch 125 preferably includes or is coupled to (e.g., via a dedicated or leased high speed line) one or more databases 126 identifying subscribers either as fixed wireless communication system subscribers or as PSTN subscribers. Thus, upon receiving the telephone number, the switch 125 accesses the databases 126 to determine where to route the call and establishes the fixed switching path for the call to proceed.

In the event that the target subscriber is a PSTN subscriber 133, 139, the regional switch 125 further determines (305) whether the PSTN subscriber is located within the LATA 155 containing the originating WLL subsystem (i.e., an intra-LATA call) or is located within another LATA (i.e., an inter-LATA call). In the event that the target subscriber is a PSTN subscriber 133 located within the LATA 155 containing the originating WLL subsystem, the regional switch 125 establishes (307) an appropriate switching path to include POP(s) 120, 121 and the PSTN access switch 129 serving the LATA 155 containing the WLL subsystem, and forwards voice information forming part of the communication subsequently-received from the WLL subsystem back to the originating POI 118 (if used) via the POP(s) 120, 121 for delivery to the PSTN access switch 129 in accordance with known Class 5 switching techniques. The PSTN access switch 129 then forwards the voice information to the appropriate PSTN end office 131 (typically a Class 5 switch) for final delivery to the PSTN subscriber 133.

In the event that the target subscriber is a PSTN subscriber 139 located within an LATA 157 that does not include the originating WLL subsystem (i.e., an inter-LATA call), the regional switch 125 establishes (309) an appropriate switching path to include appropriate POP(s) 120–123 and the PSTN access switch 135 serving the LATA 157 containing the PSTN subscriber 139, and forwards the call subsequently-received from the WLL subsystem via POP(s) 122, 123 to the POI 119 (if used) providing access to the PSTN in the called LATA 157. The POI 119 forwards the call to the PSTN access switch 135, which in turn forwards the voice information to the appropriate PSTN end office 137 for final delivery to the PSTN subscriber 139.

In the event that the target subscriber is a WLL subscriber either within the LATA 155 containing the WLL subsystem or within another LATA, such as LATA 157 (e.g., when another WLL subsystem (not shown) is located in LATA 157 and is coupled to the backbone network via POI 119 and/or POP 123), the switch 125 establishes (311) a switching path that includes appropriate POP(s) (e.g., POP(s) 120, 121 for intra-LATA calls and POP(s) 120–123 for inter-LATA calls), but does not include any PSTN access switch 129, 135, and routes the subsequently-received call through the POP(s) to the appropriate POI 118, 119 (if used). The POI 118, 119 then forwards the call to the MTS 114 for delivery to the subscriber 102 via the WLL subsystem. In this case, the call remains in the wireless subsystem(s) and backbone network, and never enters the PSTN (i.e., the call never passes through a PSTN access switch 129, 135).

In the event that the target of the voice information is the calling subscriber's long distance or interexchange carrier (IXC) 145, directory assistance (e.g., "411" was dialed), operator services (e.g., "0" was dialed), or the E911 subsystem (e.g., "911" was dialed), the regional switch 125 directs the voice information to the appropriate service provider preferably via DS1 circuits. In the case of an E911 call, the regional switch 125 provides the voice information to the E911 access switch 151 (typically an E911 tandem switch), which in turn routes the call to the public safety access point (PSAP) 153 for action by the E911 dispatcher in accordance with known techniques.

The present invention, as described above, utilizes regional switching to route calls to their appropriate locations. Since regional switching is used, every voice, data, or video transmission initiated by or intended for a fixed wireless communication system subscriber 101, 102 must be routed to the regional switch 125 before being forwarded to the appropriate PSTN access switch 129, 135, POP 120, 123, or POI 118, 119 for ultimate delivery to the target subscriber unit. In contrast to prior art telephone systems that utilize localized switching within each LATA, the present invention utilizes one regional switch to serve multiple LATAs and, therefore, substantially reduces system complexity and switch requirements. By using regional switches that each serve multiple LATAs and coupling the regional switches to the existing wireline infrastructure, the present invention facilitates rapid deployment of fixed wireless communication systems to serve new markets, such as low populous markets, and substantially reduces infrastructure costs (e.g., by reducing capital expenditures in each LATA).

When the information received from the MTS 114 is data information, the MTS 114 forwards the information to the POI 118 or POP 120. In this case, the POI 118 or POP 120 forwards the information to the router subsystem 127 instead of to the regional switch 125. The router subsystem 127 is preferably deployed on a regional basis together with the regional switch 125 and is the data counterpart to the regional switch 125. The router subsystem 127 routes the data either directly to an Internet backbone system 141 (e.g., when the operator of the fixed wireless network communication system 100 is also an Internet Service Provider (ISP)) or to an external ISP 143.

FIG. 2 is an electrical block diagram of the router subsystem 127 incorporated in the communication system 100 of FIG. 1. The router subsystem 127 preferably includes digital access cross-connect switches (DACS) 201, a node router 203, and a firewall/edge router 205. The DACS 201 is commercially available from Tellabs Operations, Inc. of Lisle, Ill. and the routers 203, 205 are commercially available from Cisco Systems, Inc. of San Jose, Calif. The router subsystem 127 is preferably collocated with the regional switch 125. The router subsystem 127 is equipped to allow the system operator to either become the subscriber's ISP or provide the system subscriber 101, 102 with access to the Internet via an external ISP 143, such as AT&T WorldNet.

The subscriber 101, 102 receives data services over the same wireless and microwave resources 110–112, 116 used to provide voice telephony service, thereby requiring no additional hardware at the RU or BTS locations. Data information from or for a subscriber 101, 102 is routed appropriately into or out of the DACS 201. The DACS 201 hubs data received from the subscribers 101, 102 (i.e., compresses received DS1 circuits into DS3 circuits) and routes the received data to the node router 203. The node router 203 provides connectivity to all subscriber data servers 207–212 and to the firewall/edge router 205 connected to an Internet backbone provider.

The services supported by the router subsystem 127 and the Internet access subsystem 141 include (a) basic ISP services, such as email 207, access to the Internet, access to news groups 209, access to file transfer protocol (FTP) sites 210, and network monitoring 212; (b) electronic commerce (E-commerce) solutions, such as web site electronic store support, electronic catalog services, and credit card processing and encryption services; (c) local content and web hosting services 208, such as domain name registration (via a domain name service (DNS) server 211), electronic mail forwarding, web site construction support, and custom web site design; and (d) virtual private network services, such as wide area network services, authentication, encryption, and firewall services, and dedicated Internet access support.

The present invention encompasses a fixed wireless communication system that includes a wireless subsystem connected via a microwave link to a backbone network comprising a particular arrangement of points of presence (POPs), optional points of interface (POIs), switching centers, and router subsystems that connect the wireless subsystem to the public switched telephone network (PSTN) and/or the Internet. The backbone arrangement preferably provides for hubbing/multiplexing to be performed in at least some of the POPs to provide an economically efficient backhaul transport. In addition, the communication system preferably employs regional switching as opposed to localized switching to reduce wireline infrastructure costs and facilitate rapid system deployment while maintaining interconnection between system elements and existing infrastructure, such as POPs and POIs. The present invention further encompasses a method of regional switching for use during operation of such a communication system, wherein the method uses PSTN resources only for calls between wireless subscribers and PSTN subscribers, thereby eliminating PSTN access charges for calls solely between wireless subscribers.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method for a regional switch to facilitate communication between a first wireless subsystem located in a first geographic area served by a first public switched telephone network (PSTN) access switch and one of a PSTN subscriber located in the first geographic area, a PSTN subscriber located in a second geographic area served by a second PSTN access switch, and a second wireless subsystem located in the second geographic area, the method comprising the steps of:

receiving call set-up information from one of the first wireless subsystem, the second wireless subsystem, the PSTN subscriber located in the first geographic area, and the PSTN subscriber located in the second geographic area;

determining whether the call set-up information indicates a communication between the first wireless subsystem and the PSTN subscriber located in the second geographic area;

in the event that the call set-up information indicates a communication between the first wireless subsystem and the PSTN subscriber located in the second geographic area, establishing a switching path for the communication, wherein the switching path includes at least a first point of presence (POP) operably coupled between the regional switch and the first wireless subsystem, and at least a second POP operably coupled between the regional switch and the second PSTN access switch;

determining whether the call set-up information indicates a communication between the first wireless subsystem and the second wireless subsystem; and in the event that the call set-up information indicates a communication between the first wireless subsystem and the second wireless subsystem, establishing a switching path for the communication, wherein the switching path includes the at least a second POP and the at least a first POP, but does not include any PSTN access switch.

2. The method of claim 1, further comprising the steps of:

determining whether the call set-up information indicates a communication between the first wireless subsystem and the PSTN subscriber located in the first geographic area; and in the event that the call set-up information indicates a communication between the first wireless subsystem and the PSTN subscriber located in the first geographic area, establishing a switching path for the communication, wherein the switching path includes the at least a first POP and the first PSTN access switch.

3. The method of claim 1, wherein the step of determining comprises the step of:

comparing the call set-up information to identification information stored in at least one database that is operably coupled to the regional switch.

4. The method of claim 1, wherein the call set-up information comprises a telephone number.

5. A method for a regional switch to facilitate communication between a wireless subsystem located in a first geographic area served by a first public switched telephone network (PSTN) access switch and one of a PSTN subscriber located in the first geographic area and a PSTN subscriber located in a second geographic area served by a second PSTN access switch, wherein the regional switch further facilitates communication within the wireless subsystem, the method comprising the steps of:

receiving call set-up information from one of the wireless subsystem, the PSTN subscriber located in the first geographic area and the PSTN subscriber located in the second geographic area;

determining whether the call set-up information indicates a communication between the wireless subsystem and the PSTN subscriber located in the second geographic area;

in the event that the call set-up information indicates a communication between the wireless subsystem and the PSTN subscriber located in the second geographic area, establishing a switching path for the communication, wherein the switching path includes at least a first point of presence (POP) operably coupled between the regional switch and the wireless subsystem, and at least a second POP operably coupled between the regional switch and the second PSTN access switch;

determining whether the call set-up information indicates a communication within the wireless subsystem; and in the event that the call set-up information indicates a communication within the wireless subsystem, establishing a switching path for the communication, wherein the switching path includes the at least a first POP, but does not include the first PSTN access switch.

* * * * *